UNITED STATES PATENT OFFICE.

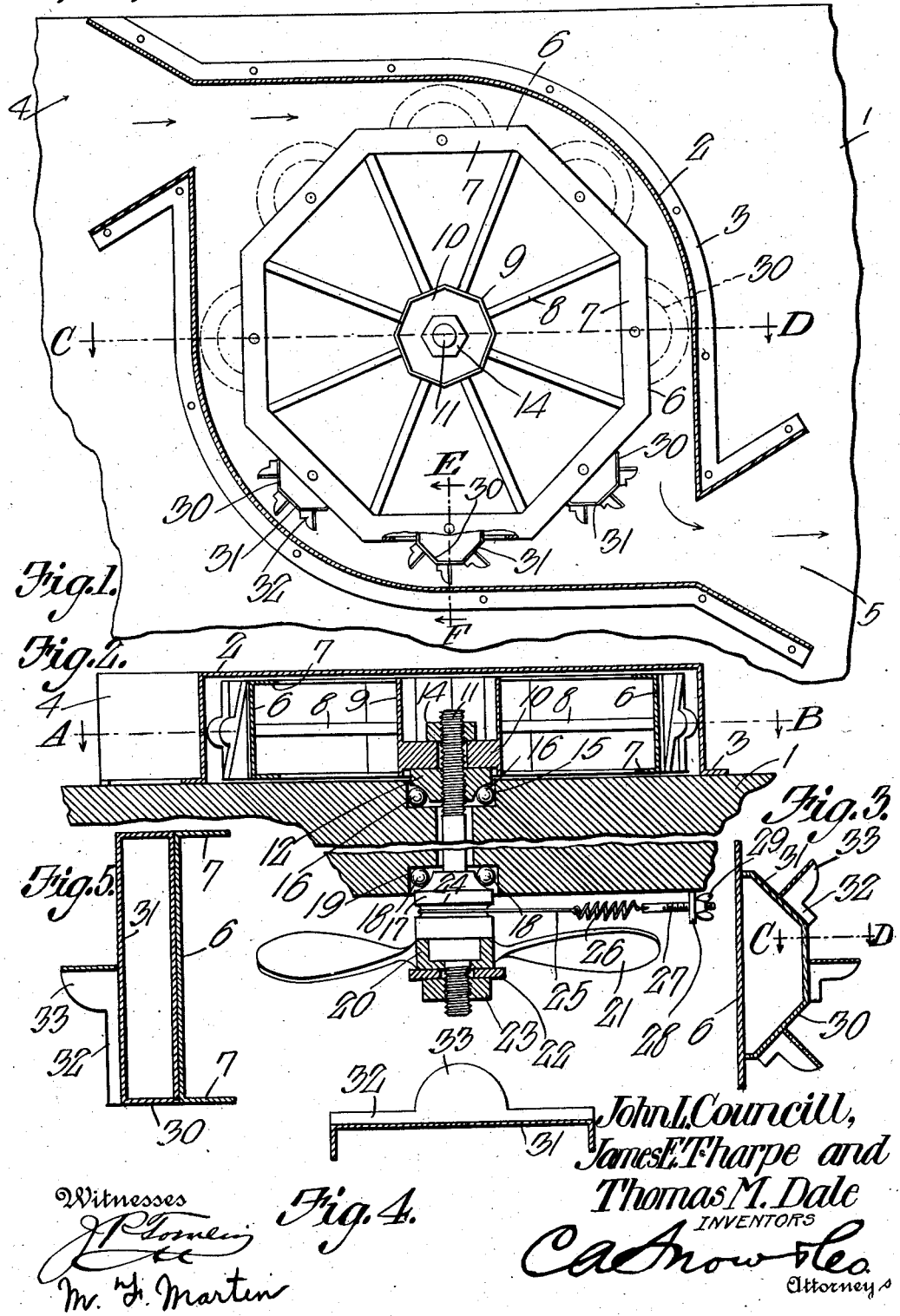

JOHN L. COUNCILL, JAMES E. THARPE, AND THOMAS M. DALE, OF STATESVILLE, NORTH CAROLINA.

AIR-PROPELLED CAR-FAN.

1,027,462.   Specification of Letters Patent.   Patented May 28, 1912.

Application filed October 30, 1911. Serial No. 657,568.

*To all whom it may concern:*

Be it known that we, JOHN L. COUNCILL, JAMES E. THARPE, and THOMAS M. DALE, citizens of the United States, residing at Statesville, in the county of Iredell, State of North Carolina, have invented a new and useful Air-Propelled Car-Fan, of which the following is a specification.

The device forming the subject matter of this application, is adapted to be applied to some portion of a vehicle body, such, for instance, as the side wall or the top of a railway carriage, the construction being such that when the vehicle is in motion, air will enter a casing to actuate a fan located upon the outside of the vehicle, which fan is operatively connected with another fan, located within the vehicle, and adapted to maintain a draft within the vehicle.

A further object of the invention is to provide a device of this type having a driving fan of novel and improved form.

A further object of the invention is to provide novel means whereby the passengers or the occupants of the vehicle, may, at will, control the operation of the structure.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows the invention in vertical section, the cutting plane passing through the line A—B of Fig. 2; Fig. 2 is a horizontal section, the cutting plane passing through the line C—D of Fig. 1; Fig. 3 is a detail of the driving or actuating fan, enlarged from Fig. 1; Fig. 4 is a section on the line C—D of Fig. 3, the cutting plane being located parallel to one of the blades; and Fig. 5 is a fragmental section upon the line E—F of Fig. 1.

In the accompanying drawings, the numeral 1 indicates generally, a portion of a vehicle body such, for instance, as the side wall of a railway coach. Secured to the outer face of the body 1 is a casing 2, having an outstanding flange 3 whereby the casing is immediately assembled with the body 1. The casing 2 is equipped with an intake funnel 4, and with a diagonally disposed outlet funnel 5.

Journaled for rotation in the casing 2, and located upon the outside of the vehicle body 1 is a driving fan the periphery of which is polygonal, and preferably eight-sided, the fan comprising a series of rim plates 6, having upwardly extended flanges 7. Spokes 8 unite the rim plates 6 with a tubular hub 9, having a reinforcing plate 10 disposed transversely in its interior.

A shaft 11 extends through the vehicle body 1 and is journaled therein in a manner to be described hereinafter, one of the threaded ends of the shaft 11 passing through the reinforcing plate 6. A bearing 12 is carried by the outer threaded end of the shaft 11, and a nut 14, carried by the extremity of the shaft 11, coöperates with the bearing 12 in gripping the reinforcing plate 6 of the driving fan, so that the driving fan and the shaft 11 are held for simultaneous rotation. The bearing 12 may be received in a recess 15 formed in the outer face of the vehicle body 1, the bearing 12 engaging balls 16 which are held in the recess 15. Upon its inner end, the shaft 11 carries a bearing 17, engaging balls 18, located in a recess 19 formed in the inner face of the body 1 of the vehicle. Engaged with the bearing 17 is the hub 20 of a fan 21, the hub 20 being engaged by a washer 22, held in place by a nut 23 threaded upon the inner end of the shaft 11.

The inner hub 17 is provided with a circumscribing groove 24, receiving a strap brake 25, the inner end of which is connected with a retractile spring 26, secured to one end of a screw 27, slidably mounted in an abutment 28, projecting inwardly from the vehicle body 1, there being a nut 29, upon the free end of the screw 27, the nut 29 being adapted to engage the abutment 28.

Secured to each of the rim plates 6 of the actuating fan are lugs 30, of polygonal cross section, the faces 31 of the lugs 30 being disposed transversely of the driving fan. Mounted upon each of the faces 31 of the lugs 30 are outstanding blades 32, equipped intermediate their ends with outwardly projecting vanes 33. The blades 30 extend diagonally of the faces 31 upon which they are mounted, the planes of the blades being disposed out of rectangular relation with respect to the median plane of the actuating or driving fan.

The practical operation of the device is as follows. When the vehicle is in motion, air will enter the intake funnel 4 and impinge against the rim plates 6 of the driving fan in the first instance, the air, as it traverses the rim plates 6, subsequently engaging the faces 31 of the lugs 30, the air ultimately engaging the vanes 33. Owing to the fact that the vanes 33 extend diagonally of the faces 31 upon which they are mounted, the air, in passing between the periphery of the driving fan and the casing 2 will, to some extent, follow a sinuous course. The air, being deflected by the inclined vanes 33, will strike against the outer face of the vehicle body 1, and against the casing 2, and be deflected inwardly, toward the median plane of the wheel, for engagement with the driving fan. The construction of the driving fan is such that this member will have great strength, it being recalled that strength is a necessary feature in a device of this type, since the vehicle, moving at a high rate of speed, causes the air to impinge with much force against the driving fan.

It will of course be understood that the driving fan will serve to actuate the fan 21, which fan 21 will cause a draft within the car or other vehicle. When the occupant of the car desires that the draft be stopped, the wing nut 29 may be rotated, retracting the screw 27, and putting the spring 26 under tension, whereupon the strap brake 25 will engage the bearing 17 and hold the shaft 11 against rotation.

Having thus described the invention, what is claimed is:—

1. In a device of the class described, a vehicle body; a shaft journaled for rotation in the vehicle body; a fan secured to the outer end of the shaft and having a polygonal periphery; polygonal lugs secured to the faces of the fan; blades extended across the faces of the lugs; a casing applied to the outer face of the vehicle body, the casing inclosing the fan, the casing being provided with an intake member, adapted to receive air when the vehicle is in motion, and to discharge the air against the polygonal periphery of the fan, against the faces of the lugs, and against the blades; and a second fan secured to the inner end of the shaft, within the vehicle.

2. In a device of the class described, a vehicle body; a shaft journaled for rotation in the vehicle body; a fan secured to the outer end of the shaft and provided with a polygonal periphery; polygonal lugs applied to the polygonal faces of the fan, the faces of the lugs extending transversely of the faces of the fan; blades applied to the faces of the lugs and extended transversely of the fan; a second fan secured to the inner end of the shaft and located within the vehicle body; a casing applied to the outer face of the vehicle body and inclosing the first named fan, the casing having an intake member adapted to receive air when the vehicle is in motion, and to discharge air against the polygonal periphery of the first mentioned fan, against the faces of the lugs, and against the blades; and means located within the vehicle for holding the shaft against rotation.

In testimony that we claim the foregoing as our own, we have hereto affixed our signatures in the presence of two witnesses.

JOHN L. COUNCILL.
JAMES E. THARPE.
THOMAS M. DALE.

Witnesses:
DEWEY L. RAYMER,
J. E. BAYD.

---

Copies of this patent may be obtained for five cents each, by addressing the "Commissioner of Patents. Washington, D. C."